Patented Dec. 22, 1931

1,838,062

UNITED STATES PATENT OFFICE

JAN TEPPEMA, OF AKRON, OHIO

ACCELERATOR OF VULCANIZATION

No Drawing.   Application filed March 11, 1929.   Serial No. 346,260.

My invention relates to the treatment of rubber and it has particular relation to a method whereby the vulcanization of a rubber compound may be hastened or accelerated.

This application is a continuation in part of application Serial No. 239,266, filed December 10, 1927, now matured into Patent 1,757,930.

More specifically, my invention has for one of its objects the provision of a new class of vulcanization accelerators for rubber compounds.

Another object of the invention is to provide a compound of the above designated class which may be manufactured inexpensively and which may be readily incorporated into rubber upon the rolls of a mill without danger of scorching. When so employed the product produces rapid cures at relatively low temperatures.

Another object of the invention is to provide an accelerator of the rate of vulcanization of rubber compounds which is composed of the reaction product of a 2-halogen thiazole and its substitution products, and an organic sulphide.

It has been observed heretofore that certain thiazole compounds, for example mercaptobenzothiazole, whose structural formula may be represented as follows:

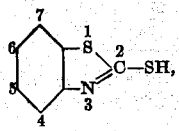

when incorporated into a vulcanizable rubber compound, greatly accelerates the rate of vulcanization of the latter. The product resulting from the practice of this process has a high degree of tensile strength and elasticity.

This invention consists in the discovery that certain thiazole compounds, for example 2-chlor benzothiazole having the structural formula:

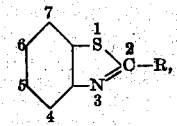

in which R represents a halide. may be caused to react with alkali salts of organic sulphides, for example, the sodium salt of diethyl dithiocarbamate, to produce a material having excellent properties as an accelerator when incorporated in rubber compounds.

The first mentioned material (2-chlor benzothiazole) may be conveniently prepared by the following method:

Dissolve 200 parts of crude mercaptobenzothiazole in 400 parts of pentachlorethane and then bubble chlorine gas through this solution for a period of several hours while the solution is being heated under a reflux condenser. Chlorination should continue preferably from five to seven hours, although this period may be shortened or increased somewhat at the will of the operator. However, the longer periods of chlorination result in a more complete reaction. The reaction product is then distilled and the fraction boiling at a temperature of 240° to 252° C. is separated from the remainder and represents the major portion of the reaction product of chlorine and mercapto-benzothiazole.

The 2-chlor benzothiazole prepared by the preceding method may be caused to react with various dithiocarbamates to produce excellent accelerators for rubber compounds.

The reaction product of 2-chlor benzothiazole and the sodium salt of diethyl dithiocarbamate is an example of a material of this class which has been found to be very efficient. The following method may be employed in the manufacture of this material.

Dissolve 133 grams of 2-chlor benzothiazole and 120 grams of sodium diethyl dithiocarbamate in 500 cc. of ethyl alcohol and reflux the solution for a period of six hours. The alcohol is then distilled off preferably under a reduced pressure and the reaction product remaining in the form of a residual oil is washed with water. The material may then be dried with anhydrous calcium chloride ($CaCl_2$) and filtered. The oil when distilled at a pressure of five mm. of mercury yields a light yellow oil which is a non-accelerator and a resinous residue which is an accelerator.

The invention is not limited to the reaction product of 2-chlor benzothiazole with the alkali salts of dithiocarbamates, but it also includes the substituted chlor-thiazoles; for example, 6-nitro 2-chlor benzothiazole may be caused to react with diethyl dithiocarbamate by the following method:

Dissolve 35 grams of 6-nitro 2-chlor benzothiazole in alcohol and heat the solution to boiling and then add 30 grams of sodium diethyl dithiocarbamate. After the solution has boiled for a period of five to ten minutes it solidifies as a yellow mass. The vessel containing the mass is exposed to the heat of a small flame for a period of an hour and is then cooled. The reaction product precipitates as a crystalline material which should be washed with water to remove any sodium chloride formed during the reaction. The crystalline material may be further purified by recrystallizing it from boiling alcohol from which it precipitates in form of yellow needles having a melting point of 120 to 122 degrees C.

The invention also includes the reaction products of halogenated thiazoles with various dithiocarbamates other than diethyl dithiocarbamate. Specific examples of these materials are the reaction products of chlor benzothiazoles with the salts of piperydyl dithiocarbamates (semi-solid oily substances), the reaction product of chlor benzothiazole with sodium dibenzyl dithiocarbamate (a dark oily material), the reaction product of sodium piperydyl dithiocarbamate with 2-chlor 6-nitrobenzothiazole (a crystalline substance having a melting point of 151–155° C.), the reaction product of sodium dibenzyl dithiocarbamate with 2-chlor 6-nitrobenzothiazole (a light yellow solid having a melting point of 141–142° C.) and the chlor benzo thiazole derivates of the material represented by the formula

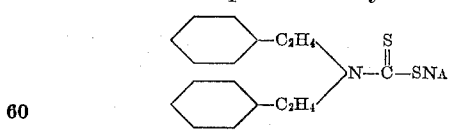

All of these materials may be prepared by methods similar to those employed in the preparation of the reaction product of 2-chlor benzothiazole and diethyl dithiocarbamate. The compounds so prepared may be employed as accelerators in most of the standard rubber compounds. The following is an example of a formula which insures excellent results when any of the substances above mentioned are employed as accelerators.

Extracted rubber _____ 100 parts
Zinc oxide _____ 5 parts
Sulphur _____ 3 parts
Stearic acid _____ 1.5 parts
Accelerator _____ .5 part Samples of these materials were subjected to vulcanization by steam heat in a mold and the samples after vulcanization were subjected to physical tests to ascertain their yield and tensile strength. The results of these tests are contained in the following tables:

Reaction product 2-chlor benzothiazole sodium diethyl dithiocarbamate

| Cure | Load in kgs/cm² at 700% elong. | Tensile strength kgs/cm² | Percent elong. |
|---|---|---|---|
| :20 at 20# | 95 | 180 | 810 |
| :45 at 20# | 164 | 230 | 760 |
| :30 at 40# | 85 | 165 | 800 |

Reaction product 2-chlor 6-nitrobenzothiazole and sodium diethyl dithiocarbamate

| :20 at 20# | 165 | 200 | 710 |

Reaction product of sodium piperydyl dithiocarbamate and 2-chlor benzothiazole

| Cure | Load in kgs/cm² at | | Tensile strength kgs/cm² | Percent elong. |
|---|---|---|---|---|
| | 500% elong. | 700% elong. | | |
| :20 at 20# | 9 | 21 | 60 | 935 |
| :45 at 20# | 16 | 50 | 135 | 875 |
| 1:10 at 20# | 18 | 58 | 150 | 865 |
| :30 at 40# | 15 | 43 | 125 | 880 |

Reaction product sodium dibenzyl dithiocarbamate and 2-chlor benzothiazole

| :20 at 20# | 7 | 15 | 35 | 860 |
| :45 at 20# | 22 | 76 | 170 | 840 |
| 1:10 at 20# | 27 | 99 | 190 | 810 |
| :30 at 40# | 22 | 66 | 145 | 845 |

Reaction product sodium piperydyl dithiocarbamate and 2-chlor 6-nitro benzothiazole

| Cure | Load in kgs/cm² | | Tensile strength kgs/cm² | Percent elong. |
|---|---|---|---|---|
| | 500% elong. | 700% elong. | | |
| :20 at 20# | 40 | 200 | 205 | 705 |
| :45 at 20# | 47 | 186 | 190 | 705 |
| 1:10 at 20# | 43 | 173 | 205 | 730 |
| :30 at 40# | 33 | 116 | 180 | 770 |

*Reaction product sodium dibenzyl dithiocarbamate and 2-chlor 6-nitro benzothiazole*

|            | 300% elong. | 500% elong. |     |     |
|------------|-------------|-------------|-----|-----|
| :20 at 20# | 50          | 200         | 235 | 730 |
| :45 at 20# | 46          | 178         | 235 | 750 |
| 1:10 at 20#| 40          | 159         | 205 | 745 |
| :30 at 20# | 27          | 88          | 180 | 815 |

It will be apparent from the preceding tables that the use of these accelerators results in rapid cures at comparatively low temperatures and the vulcanized product has excellent physical properties both with regard to tensile strength and elongation.

In the preceding examples specific reference has been made only to the reaction products of 2-chlor benzothiazole with the sodium salts of the dithiocarbamates. However, the bromo benzothiazoles may be substituted for the chlor thiazoles and the potassium or other salts of the dithiocarbamates may be substituted in lieu of the sodium salt.

Although I have described in detail only the preferred embodiments of the invention, it will be apparent to those skilled in the art that it is not so limited but that various minor modifications may be made therein without departing from the spirit of the invention or from the scope of the appended claims.

What I claim is:

1. A method of treating rubber which comprises subjecting it to vulcanization in the presence of a material having the following structural formula:

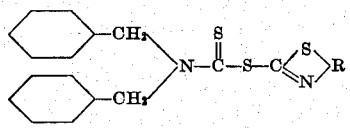

in which R represents an aryl group.

2. A method of treating rubber which comprises subjecting it to vulcanization in the presence of a material having the following structural formula:

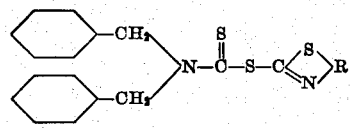

in which R represents a benzene nucleus.

3. A method of treating rubber which comprises subjecting it to vulcanization in the presence of a material having the following structural formula:

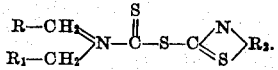

in which R and $R_1$ represent benzene nuclei and $R_2$ represents an aryl group.

4. A rubber product that has been vulcanized in the presence of a material having the following structural formula:

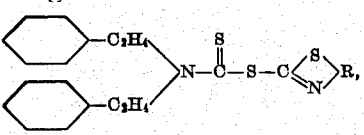

in which R represents an aryl group.

5. A rubber product that has been vulcanized in the presence of a material having the following structural formula:

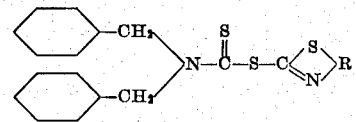

in which R represents a benzene nucleus.

6. A rubber product that has been vulcanized in the presence of a material having the following structural formula:

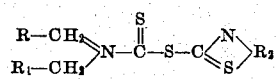

in which R, $R_1$ and $R_2$ represent benzene nuclei.

7. A rubber product that has been vulcanized in the presence of a reaction product of an alkaline salt of dibenzyl dithiocarbamate and 2-halogen substituted benzothiazole.

8. A method of treating rubber which comprises subjecting it to vulcanization in the presence of a material having the formula

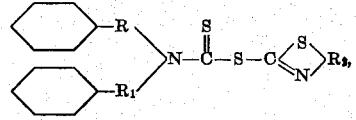

where R and $R_1$ are straight chain hydrocarbon groups and $R_2$ is an aryl group.

In witness whereof, I have hereunto signed my name.

Signed at Akron, in the county of Summit and State of Ohio, U. S. A., this 8th day of March, 1929.

JAN TEPPEMA.